United States Patent
Audic et al.

(10) Patent No.: US 8,827,734 B2
(45) Date of Patent: Sep. 9, 2014

(54) TURBO MACHINE ELECTRICAL CONNECTION ELEMENT

(75) Inventors: Yvon Audic, Bieville (FR); Geoffray Deterre, Moissy Cramayel Cedex (FR); Julien Labranche, Poissy (FR); Nicolas Prinzivalle, Saint Remy sur Avre (FR)

(73) Assignee: SNECMA, Paris (FR)

( * ) Notice: Subject to any disclaimer, the term of this patent is extended or adjusted under 35 U.S.C. 154(b) by 156 days.

(21) Appl. No.: 13/505,987

(22) PCT Filed: Nov. 5, 2010

(86) PCT No.: PCT/FR2010/052385
§ 371 (c)(1),
(2), (4) Date: May 3, 2012

(87) PCT Pub. No.: WO2011/055094
PCT Pub. Date: May 12, 2011

(65) Prior Publication Data
US 2012/0225573 A1    Sep. 6, 2012

(30) Foreign Application Priority Data
Nov. 6, 2009   (FR) ...................... 09 05345

(51) Int. Cl.
*H01R 13/52*     (2006.01)
*H01R 13/56*     (2006.01)
*H02G 3/04*      (2006.01)
*H02G 15/007*    (2006.01)
*H02G 3/06*      (2006.01)

(52) U.S. Cl.
CPC ........... *H02G 3/0475* (2013.01); *H02G 15/007* (2013.01); *H01R 13/562* (2013.01); *H02G 3/0691* (2013.01)

USPC .......................................................... 439/278

(58) Field of Classification Search
CPC ....................................................... H01R 13/52
USPC ........... 439/278; 174/77, 77 R, 74, 80, 81, 89
See application file for complete search history.

(56) References Cited

U.S. PATENT DOCUMENTS

| 5,399,808 | A    | 3/1995 | Carter et al. |
| 2007/0224852 | A1* | 9/2007 | Gouzien et al. ............. 439/76.1 |

(Continued)

FOREIGN PATENT DOCUMENTS

| EP | 1 313 190 | 5/2003 |
| EP | 1 858 116 | 11/2007 |

(Continued)

OTHER PUBLICATIONS

International Search Report Issued Feb. 1, 2012 in PCT/FR10/052385 filed Nov. 5, 2010.

*Primary Examiner* — Timothy Thompson
*Assistant Examiner* — Charles Pizzuto
(74) *Attorney, Agent, or Firm* — Oblon, Spivak, McClelland, Maier & Neustadt, L.L.P.

(57) ABSTRACT

An electrical connection element for a turbine engine, including conductors connected to a connector by a tubular coupling surrounding one end of the conductors, and an insert providing protection against wear of the conductors being mounted in the tubular coupling. The insert includes a substantially tubular central body containing the conductors and provided over at least a fraction of its length with a series of spacers bearing against an inside surface of the tubular coupling of the connection element so as to hold the central body at a distance from the inside surface.

12 Claims, 2 Drawing Sheets

(56) References Cited

U.S. PATENT DOCUMENTS

2007/0270037 A1* 11/2007 Deterre et al. ................ 439/610
2008/0308316 A1   12/2008 Ferragut et al.
2009/0242235 A1   10/2009 Kawakami et al.

FOREIGN PATENT DOCUMENTS

| FR | 2 891 954   | 4/2007  |
| WO | 92 22115    | 12/1992 |
| WO | 2008 031655 | 3/2008  |

* cited by examiner

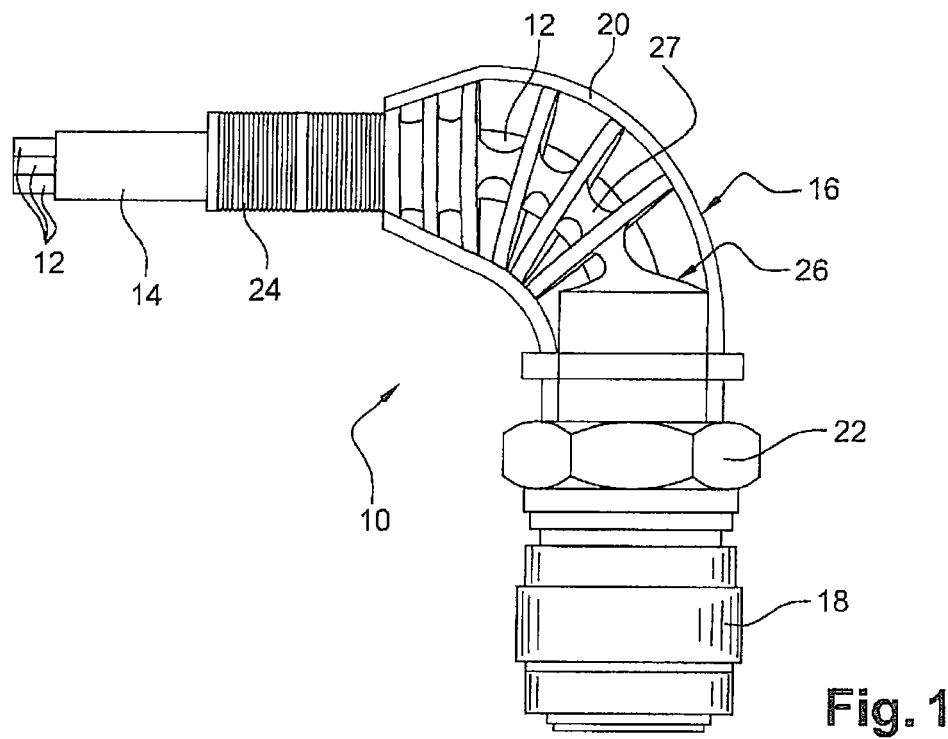
Fig. 1
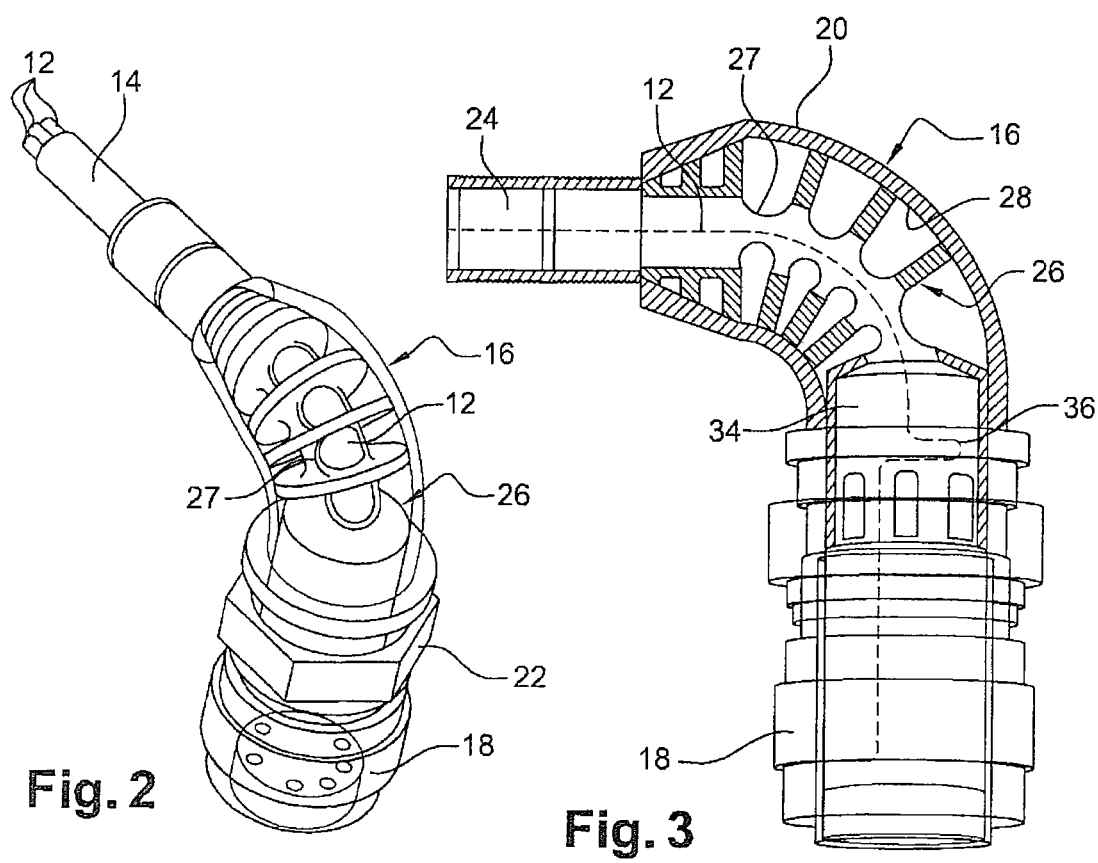
Fig. 2
Fig. 3

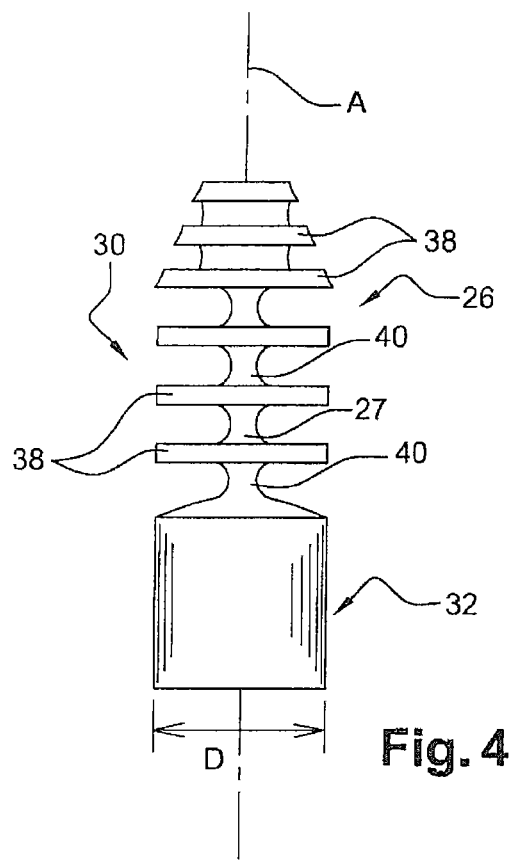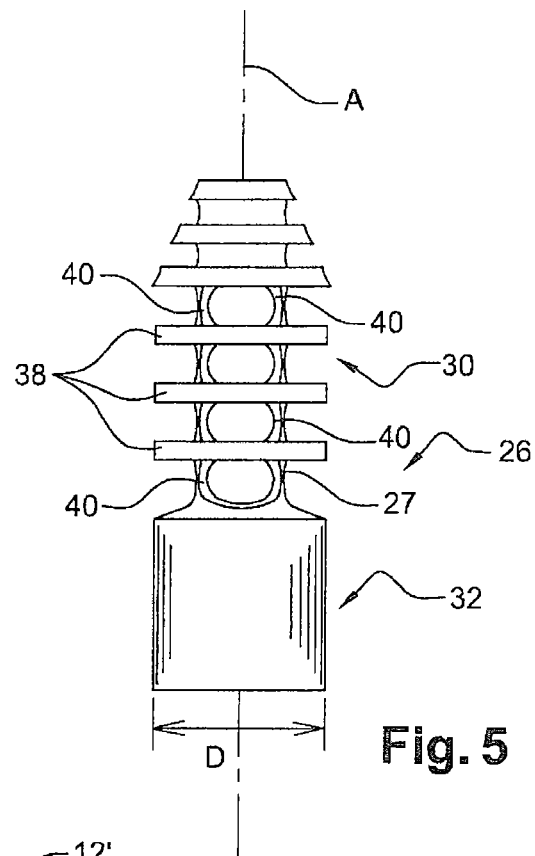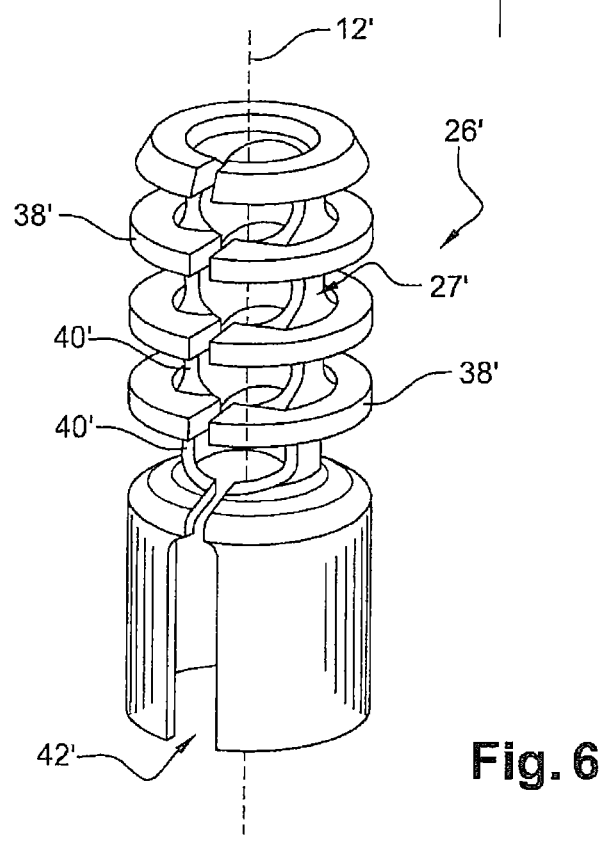

TURBO MACHINE ELECTRICAL CONNECTION ELEMENT

The present invention relates to an electrical connection element for a turbine engine such as an airplane turboprop or turbojet, and it also relates to an airplane engine including such an element.

An electrical connection element comprises a set of electrical conductors that provide connections between various pieces of electrical equipment, such as between sensors and an electronic engine regulator system.

The ends of the conductors are connected to a connector via a coupling device comprising a tubular coupling that surrounds the ends of the conductors.

The coupling device serves to house extra lengths of the conductors, which extra lengths enable the connector to be removed in order to be repaired or changed during a maintenance operation.

In operation, the connection element is subjected to vibration, thereby giving rise to wear of the conductors by rubbing against the inside surface of the tubular coupling of the device, which can give rise to electrical faults. The presence of an anti-wear coating on the inside surface of the tubular coupling serves to limit this wear, but it is not always effective.

Proposals have already been made to hold the conductors in a coupling device by means of molded polymer parts that surround the conductors. Nevertheless, that solution is not always effective and the molded parts around the conductors cannot be removed. In addition, such parts do not withstand the high temperatures to which the electrical connection element is subjected in operation, which temperatures are of the order of 200° C.

An object of the present invention is to remedy the drawbacks of the prior art in a manner that is simple, effective, and inexpensive.

The invention provides an electrical connection element having an insert for protecting the conductors against wear as a result of rubbing against the inside surface of the tubular coupling of the connection element, the insert having a long lifetime and good ability to withstand high temperatures and vibration.

To this end, the invention provides an electrical connection element for a turbine engine, the element having conductors connected to a connector by a tubular coupling surrounding one end of the conductors, the element being characterized in that an insert for providing protection against wear of the conductors is mounted in the tubular coupling around the conductors, said insert comprising a substantially tubular central body containing the conductors and provided over at least a fraction of its length with a series of spacers extending substantially radially outwards and bearing against the inside surface of the tubular coupling of the connection element so as to hold the central body at a distance from said inside surface.

The insert of the invention surrounds the conductors and holds them at a distance from the inside surface of the tubular coupling, while preventing them from rubbing against this surface, and therefore from suffering wear, by virtue of the spacers provided on its central body.

Advantageously, the insert is elastically deformable, in particular in bending, so as to make it easier to insert into and to remove from the tubular coupling of the connection element, which element may be straight or may form a bend, e.g. a 30°, 45°, 60°, or 90° bend. A single reference of flexible insert is suitable for use in a variety of tubular couplings, regardless of their shape, which is most economical. Furthermore, the insert may be incorporated in already-existing coupling devices. By way of example, the insert is made as a single piece of a plastics material, such as polytetrafluoroethylene (PTFE) that is capable of withstanding the temperatures to which the connection element is subjected in operation.

According to another characteristic of the invention, the spacers comprise parallel disks that are spaced apart from one another along the central body.

These disks, which extend around the conductors, may be connected together by longitudinal bridges of material that are elastically deformable, and that form the central body containing the conductors.

The insert may further include a tubular end that is connected to one end of the central body and that has an outside diameter that is substantially equal to the inside diameter of the tubular coupling of the connection element, said tubular end defining a storage chamber for storing extra lengths of the conductors of the connection element. These extra lengths are to allow the connector to be separated from the electrical connection element, in order to enable it to be repaired or changed.

The end of the insert remote from the tubular end may be substantially frustoconical in shape.

Advantageously, the insert includes a through longitudinal slot along its entire length, and through which the conductors of the connection element are mounted.

The insert is preferably mounted in removable manner in the tubular coupling.

The present invention also provides an airplane engine that is characterized in that it includes at least one electrical connection element as described above.

The invention can be better understood and other details, characteristics, and advantages thereof appear more clearly on reading the following description made by way of non-limiting example and with reference to the accompanying drawings, in which:

FIG. 1 is a diagrammatic side view of a coupling device for coupling conductors of an electrical connection element of an airplane engine to a connector;

FIGS. 2 and 3 are diagrammatic views of the FIG. 1 device, shown respectively in perspective and in axial section;

FIGS. 4 and 5 are diagrammatic side views of the insert of the invention; and FIG. 6 is a diagrammatic perspective view of a variant embodiment of the insert of the invention.

Reference is made initially to FIG. 1 which shows an end portion of an electrical connection element 10, the connection element 10 having one or more conductors 12 for conveying electrical signals, which conductors are surrounded by a tubular protective structure 14 and have their ends connected by a coupling device 16 to a connector 18.

The coupling device 16 comprises a tubular coupling 20 that surrounds the ends of the conductors 12, which conductors are electrically connected to the connector 18.

The tubular coupling 20 in this example is in the form of a 90° bend and at one end it carries a nut 22 that is free to rotate and that is screwed onto a corresponding portion of the connector 18 in order to secure the coupling 20 to the connector 18.

The coupling 20 has its end remote from the nut 22 provided with fastener means 24 for fastening on one end of the tubular structure 14. The coupling 20 is rigid and made of metal.

According to the invention, an insert 26 for protecting the conductors 12 against wear is housed in the tubular coupling 20 of the coupling device 16, this insert 26 surrounding the conductors 12 and keeping them at a distance from the inside surface 28 of the tubular coupling in order to prevent them from wearing by rubbing against this inside surface.

The insert 26, that can be seen more clearly in FIGS. 2 to 5, is substantially tubular in shape and comprises a central body 27 with the conductors 12 extending therein.

A portion 30 of the insert 26 is corrugated and connected to a tubular end portion 32, the corrugated portion extending for example over about two-thirds of the length of the insert, and the tubular portion extending over about one-third of the length of the insert.

The tubular end portion 32 has an outside diameter D that is substantially equal to the diameter of the inside surface 28 of the tubular coupling 20 (FIG. 3). This tubular portion 32 defines a cylindrical chamber 34 for storing an extra length 36 of the conductors, this extra length 36 enabling the connector 18 to be removed in order to enable it to be repaired or changed during a maintenance operation. The tubular portion 32 is for mounting in the end portion of the tubular coupling 20 that is situated beside the connector 18.

The corrugated portion 30 of the insert 26 is made up of disks 38 extending radially outwards from the longitudinal axis A of the insert, and presenting an outside diameter D, i.e. a diameter equal to the outside diameter of the tubular portion 32 and to the diameter of the inside surface 28 of the tubular coupling 20. The disks 38 form spacers and are designed to bear via their peripheries against the inside surface 28 of the tubular coupling 20.

The disks 38 are parallel and axially spaced apart from one another. They are connected together and to the tubular portion 32 by longitudinal bridges 40 of material that define the central body 27. Each disk 38 is connected to an adjacent disk via two parallel bridges of material that are diametrically opposite from each other.

The bridges of material 40 are elastically deformable and they allow the insert 26 to deform elastically, in particular in bending.

The end of the corrugated portion 30 that is situated remote from the tubular portion 32 is frustoconical in shape, and is designed to be inserted in the end portion of complementary shape of the tubular coupling 20 that is situated remote from the connector 18.

In a stress-free position, as shown in FIGS. 4 and 5, the insert 26 is straight in shape. The insert 26 may be mounted in a straight tubular coupling of a coupling device. There is no need to deform the insert in order to engage it in the tubular coupling. The insert 26 may also be mounted in a tubular coupling forming a bend, e.g. over 30°, 45°, 60°, or 90°. It then needs to be deformed elastically in bending while it is being mounted in the tubular coupling.

In the example shown in FIGS. 1 to 3, the insert 26 is mounted in a tubular coupling 20 constituting a 90° bend, and it adopts this bent shape on being mounted in the body.

In the variant embodiment of FIG. 6, the insert 26' has a through longitudinal slot 42' that extends over the entire length of the insert. The slot 42' is at about 90° from the bridges 40' of material interconnecting the disks 38'. The conductors 12' are engaged in the central body 27' of the insert 26' through the slot 42'.

The insert 26, or 26' of the invention is mounted in the tubular coupling 20 of the connection element 10 as follows. The conductors 12, 12' are engaged in the central body 27, 27' of the insert either by moving in axial translation for the insert 26 or else by moving in radial translation through the slot 42' for the insert 26'. Thereafter the insert is engaged in the tubular coupling 20 and takes up its inside shape. The ends of the conductors 12 are connected to the connector, and then the nut 22 carried by the tubular coupling 20 is screwed onto the connector 18. Extra lengths 36 of the conductors 12 are then housed in the chamber 34 defined by the tubular portion 32 of the insert (FIG. 3).

In another variant of the means described and shown, the disks 38 and 38' of the insert are connected together by some number of bridges 40, 40' of material other than two, e.g. a number equal to one, three, or four. The connections between the disks may also be provided by a cylindrical wall of thickness that allows the insert to bend while conserving a desired axial dimension or length.

The invention claimed is:

1. An electrical connection element for a turbine engine, the element comprising:
   electrical conductors connected to a connector by a tubular coupling surrounding an end of the conductors; and
   an insert for providing protection against wear of the conductors, the insert being disposed in the tubular coupling around the conductors, the insert comprising a substantially tubular central body containing the conductors and provided over at least a fraction of the length with a series of spacers extending substantially radially outwards and bearing against an inside surface of the tubular coupling of the connection element so as to hold the central body at a distance from the inside surface, with no fastening of the series of spacers to the inside surface of the tubular coupling.

2. The electrical connection element according to claim 1, wherein the insert is elastically deformable, or is bendable.

3. An electrical connection element for a turbine engine, the element comprising:
   electrical conductors connected to a connector by a tubular coupling surrounding an end of the conductors; and
   an insert for providing protection against wear of the conductors, the insert being disposed in the tubular coupling around the conductors, the insert including a substantially tubular central body containing the conductors and provided over at least a fraction of the length with a series of spacers extending substantially radially outwards and bearing against an inside surface of the tubular coupling of the connection element so as to hold the central body at a distance from the inside surface, the spacers comprising parallel disks that are spaced apart from one another along the central body.

4. The electrical connection element according to claim 3, wherein the disks are connected together by longitudinal bridges of material that are elastically deformable and that form the central body.

5. The electrical connection element according to claim 3, wherein the insert further includes a tubular end connected to one end of the central body and having an outside diameter that is substantially equal to the inside diameter of the tubular coupling of the connection element, the tubular end defining a storage chamber for storing extra lengths of the conductors of the connection element.

6. The electrical connection element according to claim 5, wherein the end of the insert remote from the tubular end is substantially frustoconical in shape.

7. The electrical connection element according to claim 1, wherein the insert is made as a single piece of plastics material, or of polytetrafluoroethylene.

8. An electrical connection element for a turbine engine, the element comprising:
   electrical conductors connected to a connector by a tubular coupling surrounding an end of the conductors; and
   an insert for providing protection against wear of the conductors, the insert being disposed in the tubular coupling around the conductors, the insert having a length and including a substantially tubular central body containing the conductors and provided over at least a fraction of the length with a series of spacers extending substantially radially outwards and bearing against an inside surface of the tubular coupling of the connection element so as to hold the central body at a distance from the inside surface, the insert including a longitudinal slot extending over all of the length so as to enable the insert to be mounted on the conductors of the connection element.

9. The electrical connection element according to claim 1, wherein the insert is releasably mounted in the tubular coupling which is straight or forms a bend.

10. An airplane engine, comprising at least one electrical connection element according to claim 1.

11. An electrical connection element for a turbine engine, the element comprising:
a connector;
electrical conductors;
a tubular coupling surrounding an end of the conductors and connecting the conductors to the connector; and
an insert for providing protection against wear of the conductors, the insert being disposed in the tubular coupling around the conductors, the insert comprising a substantially tubular central body containing the conductors, the substantially tubular central body having a length and being provided over at least a fraction of the length with a series of spacers extending substantially radially outwards from the substantially tubular central body, the series of spacers bearing against an inside surface of the tubular coupling, so as to hold the substantially tubular central body at a distance from the inside surface, the insert being freely disposed in the tubular coupling so as to be adapted to be inserted into and removed from the tubular coupling by sliding therealong.

12. An airplane engine, comprising at least one electrical connection element according to claim 11.

* * * * *